(12) United States Patent
Birdsall et al.

(10) Patent No.: US 11,865,875 B2
(45) Date of Patent: Jan. 9, 2024

(54) TIRE HIGH TEMPERATURE FORECASTING SYSTEM

(71) Applicant: The Goodyear Tire & Rubber Company, Akron, OH (US)

(72) Inventors: Adam William Birdsall, Hudson, OH (US); Wesley Conyers Clark, Stow, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 654 days.

(21) Appl. No.: 16/996,088

(22) Filed: Aug. 18, 2020

(65) Prior Publication Data

US 2022/0055422 A1    Feb. 24, 2022

(51) Int. Cl.
  *B60C 23/04* (2006.01)
  *B60C 23/20* (2006.01)
  *G07C 5/12* (2006.01)

(52) U.S. Cl.
  CPC ...... *B60C 23/0479* (2013.01); *B60C 23/0401* (2013.01); *B60C 23/0486* (2013.01); *B60C 23/20* (2013.01); *G07C 5/12* (2013.01)

(58) Field of Classification Search
  CPC ............ B60C 23/0479; B60C 23/0401; B60C 23/0486; B60C 23/20; G01K 13/00; G06F 2119/08
  See application file for complete search history.

(56) References Cited

U.S. PATENT DOCUMENTS 6,025,777 A * 2/2000 Fuller ................. B60C 23/0491
                                              340/447
6,672,149 B2    1/2004 Hottebart et al.
(Continued)

FOREIGN PATENT DOCUMENTS

CN    203267677 U    11/2013
CN    204020431 U    12/2014
(Continued)

OTHER PUBLICATIONS

DPCcars, "Goodyear Intelligent Tire Demonstration", Mar. 19, 2019, YouTube, https://www.youtube.com/watch?v=0D2Eu10vj9g (Year: 2019).*

(Continued)

*Primary Examiner* — James M McPherson
*Assistant Examiner* — Kyle J Kingsland
(74) *Attorney, Agent, or Firm* — Edward T. Kennedy

(57) ABSTRACT

A tire high temperature forecasting system includes at least one tire that supports a vehicle, and at least one sensor mounted on the tire for measuring a temperature of the tire. An electronic memory capacity is in a unit mounted on the tire for storing tire identification information. A processor is in electronic communication with the sensor and the electronic memory capacity, in which the processor receives and correlates the measured temperature, a time of the temperature measurement, and the tire identification information. Transmission means transmit the measured temperature, a time of the temperature measurement, and the tire identification information to a remote processor. The remote processor executes a forecasting model, and the forecasting model generates a forecast estimate. If the forecast estimate includes a predicted high temperature that is greater than a predetermined high temperature threshold for the tire, an alert is generated by the forecasting model.

17 Claims, 7 Drawing Sheets

(56) References Cited

U.S. PATENT DOCUMENTS

| | | |
|---|---|---|
| 6,784,794 B1 | 8/2004 | McQuade et al. |
| 6,809,637 B1 | 10/2004 | Brown |
| 6,871,162 B2 | 3/2005 | Futamura et al. |
| 6,883,962 B2 | 4/2005 | Kurata |
| 6,921,197 B2 | 7/2005 | Aubel et al. |
| 6,960,994 B2 | 11/2005 | Tabata et al. |
| 6,963,273 B2 | 11/2005 | O'Brien et al. |
| 7,043,973 B2 | 5/2006 | Shepherd et al. |
| 7,277,816 B2 | 10/2007 | Kanekawa et al. |
| 7,301,445 B2 | 11/2007 | Moughler |
| 7,370,001 B2 | 5/2008 | Harris |
| 7,391,307 B2 | 6/2008 | Kuwajima |
| 7,461,713 B2 | 12/2008 | Kojima |
| 7,563,021 B2 | 7/2009 | Ichihara et al. |
| 7,594,433 B2 | 9/2009 | Bondu |
| 7,895,886 B2 | 3/2011 | Tozawa et al. |
| 8,009,027 B2 | 8/2011 | Thomas et al. |
| 8,560,289 B2 | 10/2013 | Fevrier et al. |
| 8,718,868 B2 | 5/2014 | Petrucci et al. |
| 8,849,500 B2 | 9/2014 | Gokyu et al. |
| 9,016,116 B1 | 4/2015 | Hammerschmidt |
| 9,079,461 B2 | 7/2015 | Suh et al. |
| 9,376,118 B2 | 6/2016 | Benedict et al. |
| 9,384,597 B2 | 7/2016 | Koch et al. |
| 9,552,678 B2 | 1/2017 | Meyer et al. |
| 9,636,955 B2 | 5/2017 | Singh et al. |
| 9,827,816 B2 | 11/2017 | Abughaida et al. |
| 9,963,003 B2 | 5/2018 | Schneider |
| 10,286,738 B2 | 5/2019 | Taki |
| 10,408,710 B2 | 9/2019 | Kitora |
| 10,507,697 B2 | 12/2019 | Spinnler et al. |
| 2005/0045257 A1 | 3/2005 | Kogure et al. |
| 2006/0114107 A1 | 6/2006 | Kim et al. |
| 2007/0251310 A1 | 11/2007 | Pompier |
| 2008/0018445 A1* | 1/2008 | Shimura ............ B60C 23/0496 374/E1.018 |
| 2008/0243423 A1 | 10/2008 | Irth et al. |
| 2015/0284021 A1* | 10/2015 | Singh .................... B60W 30/02 701/41 |
| 2015/0360525 A1 | 12/2015 | Singh et al. |
| 2016/0167446 A1 | 6/2016 | Xu et al. |
| 2016/0323659 A1 | 11/2016 | Singh et al. |
| 2017/0124784 A1* | 5/2017 | Wittmann ............ G06V 30/224 |
| 2020/0134939 A1 | 4/2020 | Schell et al. |
| 2020/0134942 A1 | 4/2020 | Root et al. |
| 2022/0001707 A1* | 1/2022 | Iancu ...................... B60C 23/20 |
| 2022/0222396 A1* | 7/2022 | Iizuka .................... G06F 30/15 |

FOREIGN PATENT DOCUMENTS

| | | | |
|---|---|---|---|
| CN | 107379899 A | | 11/2017 |
| CN | 108891211 A | | 11/2018 |
| CN | 109063400 A | * | 12/2018 |
| CN | 109203876 A | | 1/2019 |
| CN | 110203024 A | | 9/2019 |
| EP | 1948453 B1 | | 4/2013 |
| EP | 2311707 B1 | | 6/2016 |
| EP | 3042793 B1 | | 5/2017 |
| EP | 3238963 B1 | | 1/2019 |
| GB | 2552308 B | | 7/2020 |
| JP | 2002103931 A | | 4/2002 |
| JP | 2002103931 A | * | 4/2002 |
| WO | 2013015780 A1 | | 1/2013 |
| WO | 2014078421 A3 | | 7/2015 |
| WO | 2019040682 A1 | | 2/2019 |
| WO | 2019101849 A1 | | 5/2019 |
| WO | 2020177938 A1 | | 9/2020 |

OTHER PUBLICATIONS

English translation of Shi (CN 109063400) (Year: 2018).*
English translation of Takagi (JP 2002103931) (Year: 2002).*
European Search Report received by Applicant dated Oct. 28, 2021.

* cited by examiner

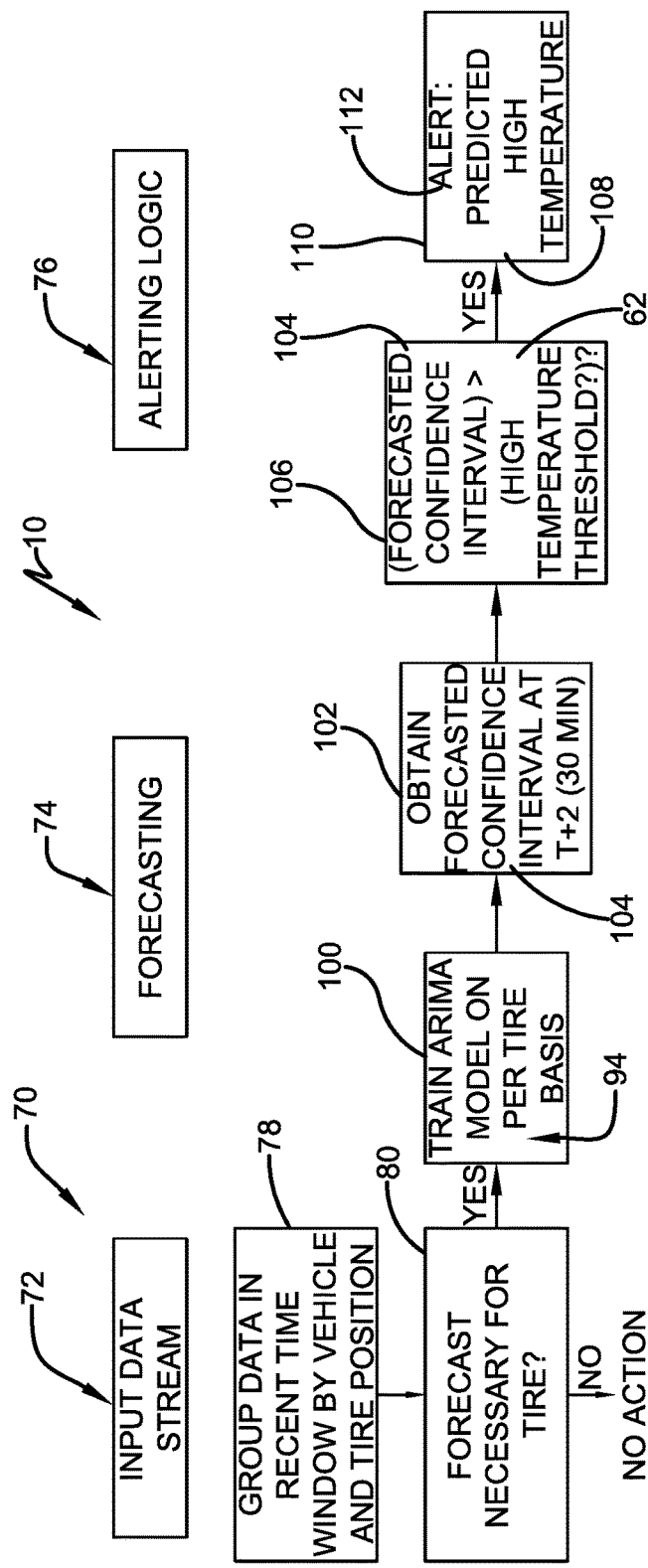
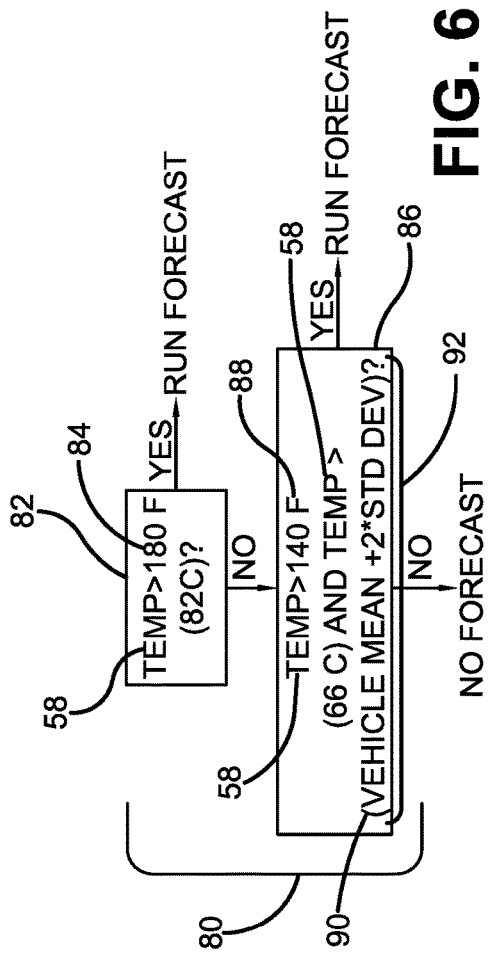
FIG. 5
FIG. 6

TIRE HIGH TEMPERATURE FORECASTING SYSTEM

FIELD OF THE INVENTION

The invention relates generally to tire monitoring and forecasting systems. More particularly, the invention relates to systems that monitor conditions in a tire and predict future tire performance. Specifically, the invention is directed to a system that obtains tire temperature data and provides a forecasting model which generates an alert if a forecast temperature is above a threshold value.

BACKGROUND OF THE INVENTION

Vehicle tires, and particularly pneumatic tires, typically have certain conditions or parameters that are beneficial to monitor during vehicle operation. For example, monitoring the temperature of a pneumatic tire may be helpful in assessing the condition and/or performance of the tire, as an excessively high temperature may indicate that there is an issue with the tire. Monitoring the temperature of a tire may also be helpful in assessing the condition and/or performance of vehicle components adjacent the tire, such as an axle or brake system component, as an excessive tire temperature may indicate potential issues with such vehicle components.

To monitor tire temperature, techniques have been developed to measure the temperature inside the tire cavity or at a structural component of the tire using sensors that are attached to the tire. Such techniques obtain temperature data in real time from the sensors.

The measured tire temperature may be correlated to a specific tire and transmitted to an electronic control system of the vehicle. The measured tire temperature data may then be employed to improve the function of vehicle systems, such as an anti-lock brake system (ABS), electronic stability control system (ECS), and the like. The measured tire temperature data may also be sent to an operator of the vehicle.

In addition, for fleets of commercial vehicles or passenger vehicles, it is desirable for a manager of the fleet to be informed of tire temperature to make informed decisions about the tires and the vehicle. For example, in the event that a real-time tire temperature measurement exceeds a threshold value, which is referred to as a high temperature, an alert may be sent to the fleet manager. The fleet manager may then instruct the vehicle operator to reduce the vehicle speed or direct the vehicle to a service center.

However, because prior art techniques employ measured real-time tire temperatures, such techniques are capable of generating a high-temperature alert only after the tire has reached the high temperature. Because high temperatures may reduce the life and/or performance of the tire, the sending of an alert after the high temperature has been reached does not enable a proactive, optimum response to a high-temperature condition.

As a result, there is a need in the art for a system that obtains tire temperature data and provides a forecasting model which predicts whether a tire will be above a temperature threshold, and generates a proactive alert if a forecast temperature is above the threshold.

SUMMARY OF THE INVENTION

According to an aspect of an exemplary embodiment of the invention, a tire high temperature forecasting system is provided. The system includes at least one tire that supports a vehicle, and at least one sensor mounted on the tire for measuring a temperature of the tire. An electronic memory capacity is in a unit mounted on the tire for storing tire identification information. A processor is in electronic communication with the sensor and the electronic memory capacity, in which the processor receives and correlates the measured temperature, a time of the temperature measurement, and the tire identification information. Transmission means transmit the measured temperature, a time of the temperature measurement, and the tire identification information to a remote processor. The remote processor executes a forecasting model, and the forecasting model generates a forecast estimate. If the forecast estimate includes a predicted high temperature that is greater than a predetermined high temperature threshold for the tire, an alert is generated by the forecasting model.

BRIEF DESCRIPTION OF THE DRAWINGS

The invention will be described by way of example and with reference to the accompanying drawings, in which:

FIG. 5 is a flow diagram showing steps of an exemplary embodiment of the tire high temperature forecasting system of the present invention;

FIG. 6 is a flow diagram of filtering steps of the exemplary embodiment of the tire high temperature forecasting system of the present invention;

Similar numerals refer to similar parts throughout the drawings.

Definitions

"Axial" and "axially" means lines or directions that are parallel to the axis of rotation of the tire.

"CAN bus" is an abbreviation for controller area network.

"Circumferential" means lines or directions extending along the perimeter of the surface of the annular tread perpendicular to the axial direction.

"Equatorial centerplane (CP)" means the plane perpendicular to the tire's axis of rotation and passing through the center of the tread.

"Footprint" means the contact patch or area of contact created by the tire tread with a flat surface as the tire rotates or rolls.

"Inboard side" means the side of the tire nearest the vehicle when the tire is mounted on a wheel and the wheel is mounted on the vehicle.

"Lateral" means an axial direction.

"Outboard side" means the side of the tire farthest away from the vehicle when the tire is mounted on a wheel and the wheel is mounted on the vehicle.

"Radial" and "radially" means directions radially toward or away from the axis of rotation of the tire.

"Rib" means a circumferentially extending strip of rubber on the tread which is defined by at least one circumferential groove and either a second such groove or a lateral edge, the strip being laterally undivided by full-depth grooves.

"Tread element" or "traction element" means a rib or a block element defined by a shape having adjacent grooves.

DETAILED DESCRIPTION OF THE INVENTION

Figure 1:
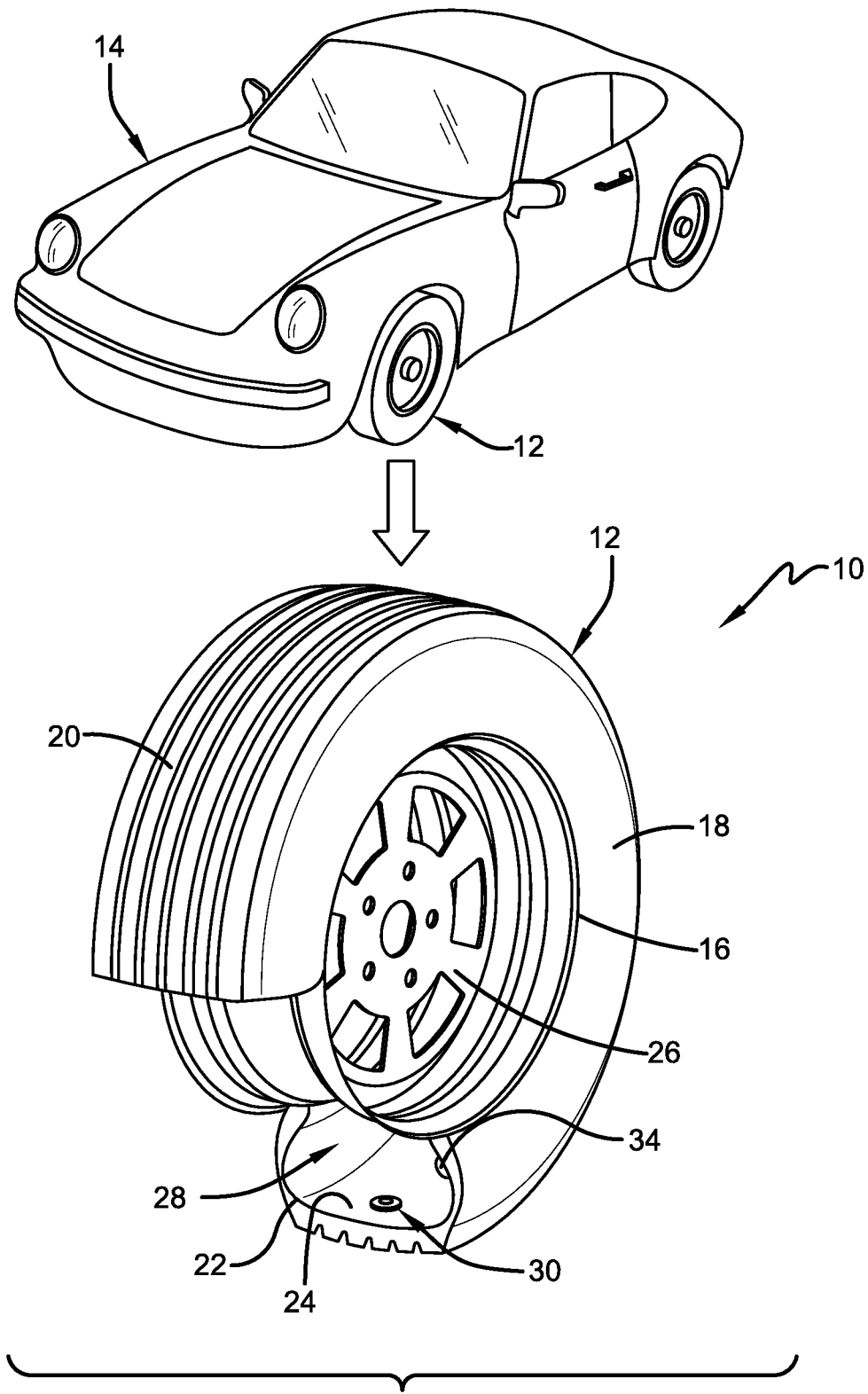
FIG. 1 is a schematic perspective view of a vehicle and tire of an exemplary embodiment of the tire high temperature forecasting system of the present invention.

Turning now to FIGS. 1 through 8B, an exemplary embodiment of the tire high temperature forecasting system of the present invention is indicated at 10. With particular reference to FIG. 1, the system 10 predicts high temperature conditions for each tire 12 supporting a vehicle 14. While the vehicle 14 is depicted as a passenger car, the invention is not to be so restricted. The principles of the invention find application in other vehicle categories such as commercial trucks, off-the-road vehicles, and the like, in which vehicles may be supported by more or fewer tires. In addition, the invention finds application in a single vehicle 14 or in fleets of vehicles.

Each tire 12 includes a pair of bead areas 16 (only one shown) and a bead core (not shown) embedded in each bead area. Each one of a pair of sidewalls 18 (only one shown) extends radially outward from a respective bead area 16 to a ground-contacting tread 20. The tire 12 is reinforced by a carcass 22 that toroidally extends from one bead area 16 to the other bead area, as known to those skilled in the art. An innerliner 24 is formed on the inside surface of the carcass 22. The tire 12 is mounted on a wheel 26 in a manner known to those skilled in the art and, when mounted, forms an internal cavity 28 that is filled with a pressurized fluid, such as air.

A sensor unit 30 may be attached to the innerliner 24 of each tire 12 by means such as an adhesive and measures certain parameters or conditions of the tire, as will be described in greater detail below. It is to be understood that the sensor unit 30 may be attached in such a manner, or to other components of the tire 12, such as between layers of the carcass 22, on or in one of the sidewalls 18, on or in the tread 20, and/or a combination thereof. For the purpose of convenience, reference herein shall be made to mounting of the sensor unit 30 on the tire 12, with the understanding that mounting includes all such attachment.

The sensor unit 30 is mounted on each tire 12 for the purpose of detecting certain real-time tire parameters inside the tire, such as tire pressure and temperature. Preferably the sensor unit 30 is a tire pressure monitoring system (TPMS) module or sensor, of a type that is commercially available, and may be of any known configuration. For the purpose of convenience, the sensor unit 30 shall be referred to as a TPMS sensor. Each TPMS sensor 30 preferably also includes electronic memory capacity for storing identification (ID) information for each tire 12, known as tire ID information. Alternatively, tire ID information may be included in another sensor unit, or in a separate tire ID storage medium, such as a tire ID tag 34.

The tire ID information may include manufacturing information for the tire 12, such as: the tire type; tire model; size information, such as rim size, width, and outer diameter; manufacturing location; manufacturing date; a treadcap code that includes or correlates to a compound identification; and a mold code that includes or correlates to a tread structure identification. The tire ID information may also include a service history or other information to identify specific features and parameters of each tire 12, as well as mechanical characteristics of the tire, such as cornering parameters, spring rate, load-inflation relationship, and the like. Such tire identification enables correlation of the measured tire parameters and the specific tire 12 to provide local or central tracking of the tire, its current condition, and/or its condition over time. In addition, global positioning system (GPS) capability may be included in the TPMS sensor 30 and/or the tire ID tag 34 to provide location tracking of the tire 12 during transport and/or location tracking of the vehicle 14 on which the tire is installed.

Figure 2:
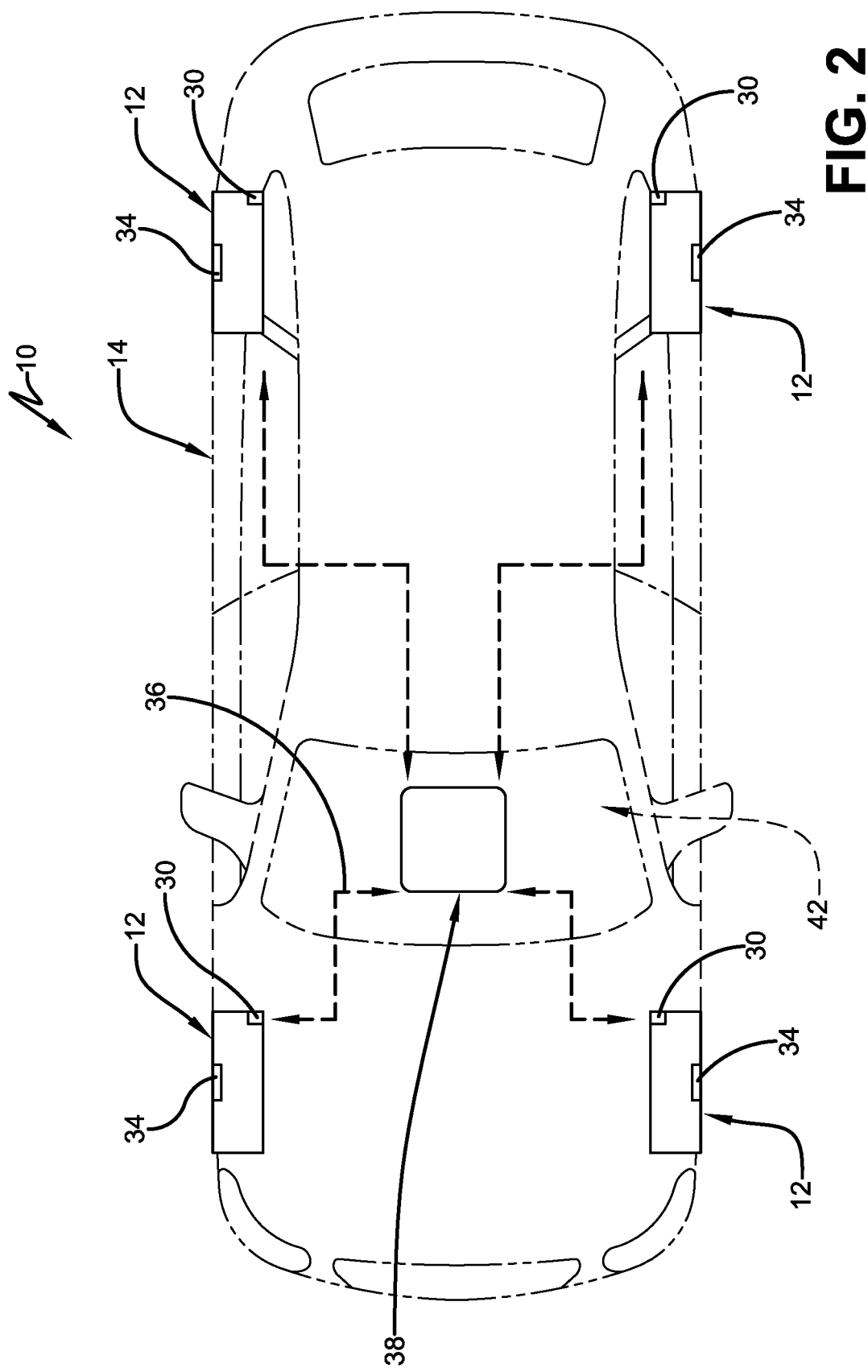
FIG. 2 is a schematic plan view of the vehicle shown in FIG. 1.

Turning now to FIG. 2, the TMPS sensor 30 and the tire ID tag 34 each include an antenna for wireless transmission 36 of the measured tire temperature, as well as tire ID data, to a processor 38. The processor 38 may be mounted on the vehicle 14 as shown, or may be integrated into the TPMS sensor 30. For the purpose of convenience, the processor 38 will be described as being mounted on the vehicle 14, with the understanding that the processor may alternatively be integrated into the TPMS sensor 30. Preferably, the processor 38 is in electronic communication with or integrated into an electronic system of the vehicle 14, such as the vehicle CAN bus system 42, which is referred to as the CAN bus.

Aspects of the tire data information system 10 preferably are executed on the processor 38 or another processor that is accessible through the vehicle CAN bus 42, which enables input of data from the TMPS sensor 30 and the tire ID tag 34, as well as input of data from other sensors that are in electronic communication with the CAN bus. In this manner, the tire high temperature forecasting system 10 enables direct measurement of tire temperature with the TPMS sensor 30, which preferably is transmitted to the processor 38. Tire ID information preferably is transmitted from the tire ID tag 34 to the processor 38. The processor 38 preferably correlates the measured tire temperature, the measurement time, and ID information for each tire 12, and may communicate the data to control systems of the vehicle 14.

Figure 3:
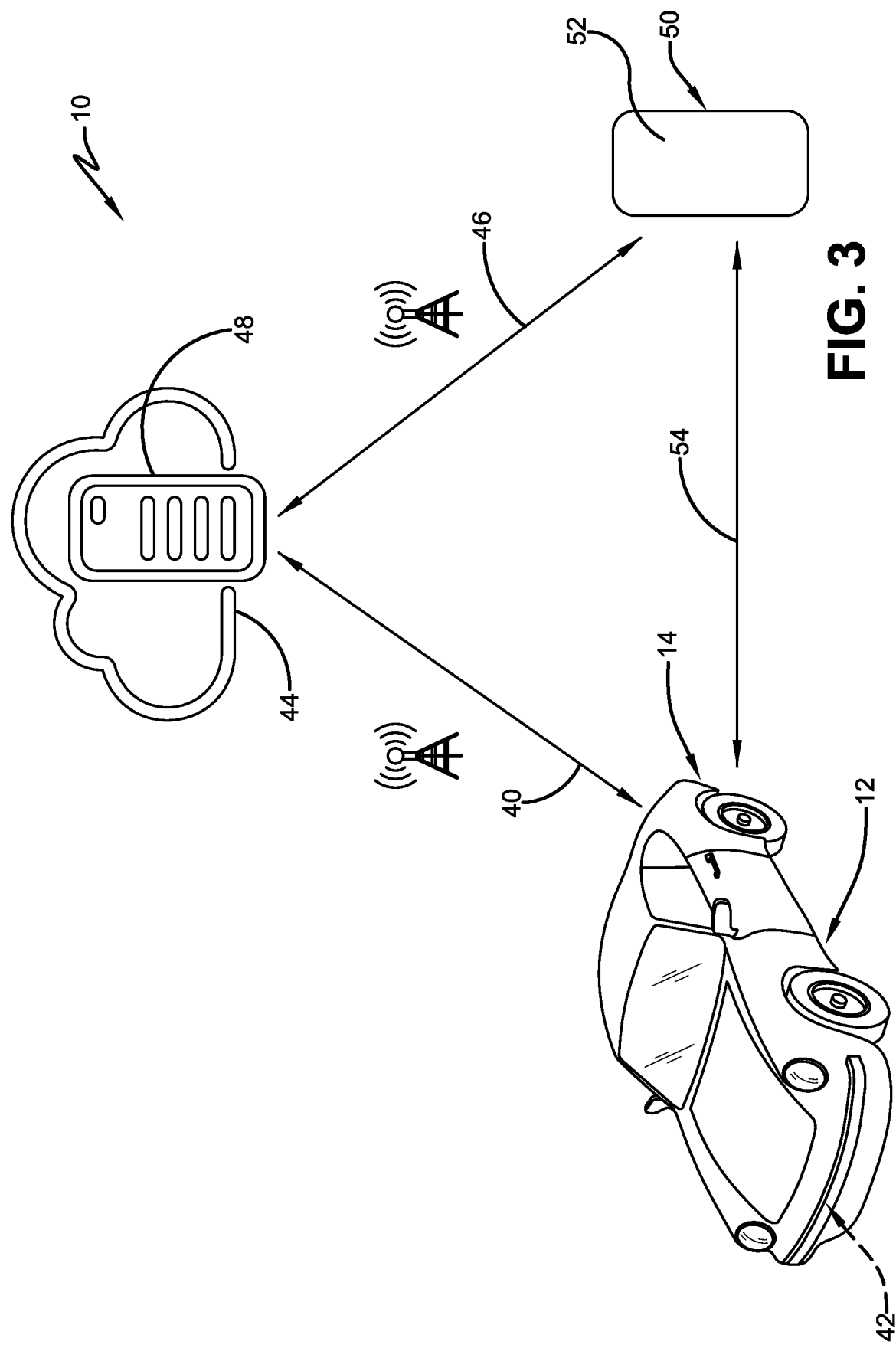
FIG. 3 is a schematic perspective view of the vehicle shown in FIG. 1 with a representation of data transmission to a cloud-based server and to a fleet management device.

Referring to FIG. 3, when the measured tire temperature, measurement time and ID information are correlated for each tire 12, the data may be wirelessly transmitted 40 from the processor 38 (FIG. 2) and/or the CAN-bus 42 on the vehicle 14 to a remote processor 48, such as a processor in a cloud-based server 44. The cloud-based server 44 preferably executes a forecasting model of the tire high temperature forecasting system 10, as will be described in greater detail below. Output from the forecasting model may be wirelessly transmitted 46 to a fleet management server 50 that includes a display 52 for showing output and/or alerts from the forecasting model, as will be also described in greater detail below. Alternatively, the fleet management server 50 may execute the forecasting model, in which case the measured tire temperature, measurement time and ID information may be wirelessly transmitted 54 from the processor 38 and/or the CAN-bus 42 directly to the fleet management server.

Figure 4:
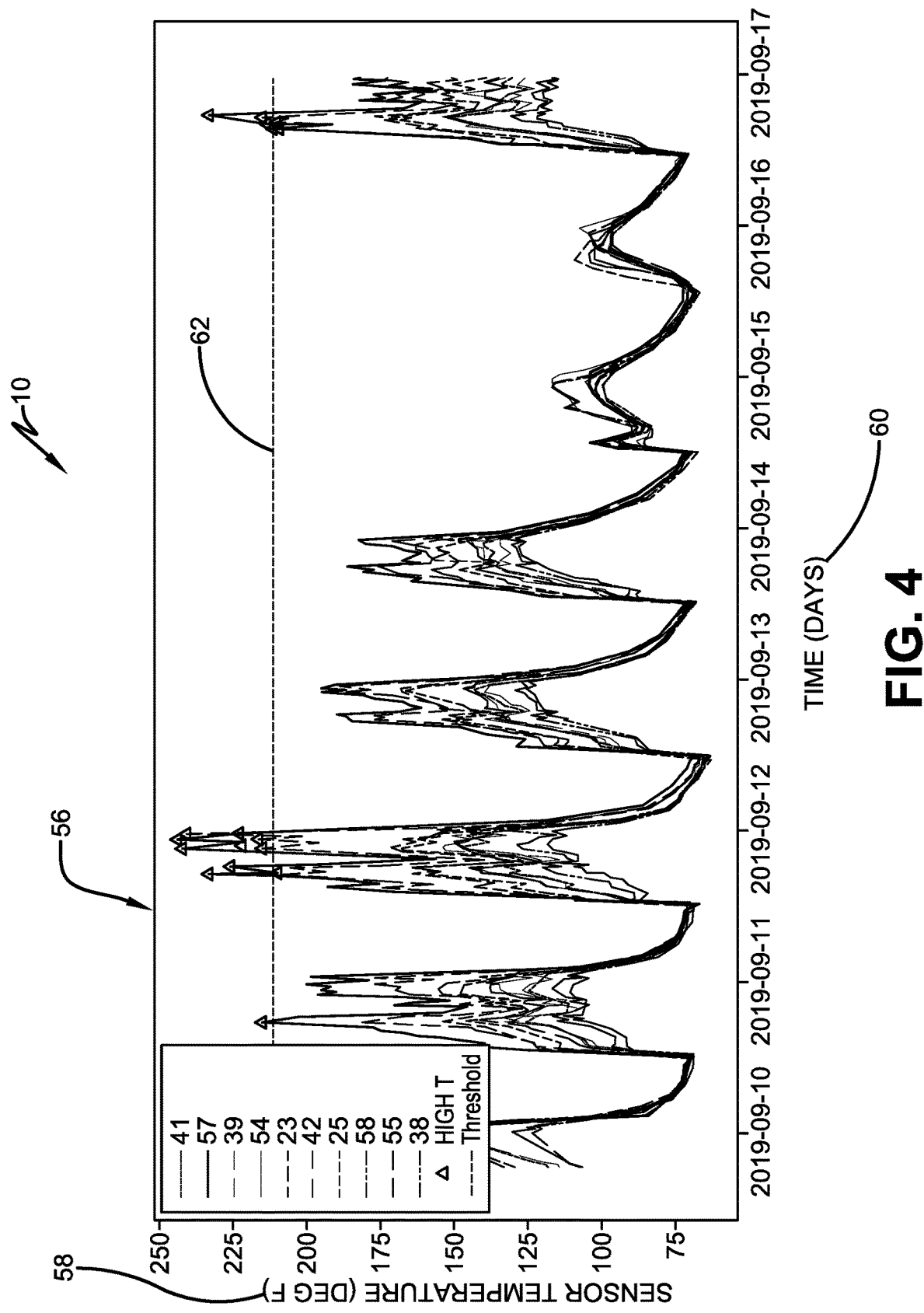
FIG. 4 is a graphical representation of measured tire temperature data.

Turning to FIG. 4, a graph 56 of measured tire temperature 58 at corresponding time periods 60 is shown. A high temperature threshold 62 for the tire 12 is set at a predetermined value based upon particular design and performance considerations for the tire. If the tire temperature exceeds the high temperature threshold 62, it is desirable to generate an alert for the fleet manager and/or vehicle operator. However, as described above, prior art systems have enabled a high-temperature alert to be generated only after the measured tire temperature 58 has reached a temperature above the high temperature threshold 62, which does not enable a proactive response and may undesirably reduce the life and/or performance of the tire 12.

Turning to FIG. 5, the tire high temperature forecasting system 10 of the present invention includes a forecasting model 70 to predict if the tire 12 will be above the high temperature threshold 62 (FIG. 4). As described above, the forecasting model 70 may be executed on the cloud-based server 44 or on the fleet management server 50. The forecasting model 70 includes a filtering module 72, a forecasting module 74, and an alert module 76.

The filtering module 72 includes an input sub-module 78. The input sub-module 78 receives and groups the measured tire temperature data 58 according to the corresponding measurement time 60, the specific tire 12 in which the temperature was measured, and the vehicle 14 on which the tire is mounted. Once the data is grouped in the input sub-module 78, it is analyzed in a filter sub-module 80.

With additional reference to FIG. 6, in the filter sub-module 80, the measured tire temperature 58 from the sensor 30 (FIG. 1) is analyzed under a first condition 82. Preferably, the first condition 82 includes comparing the measured tire temperature 58 to a first predetermined high temperature value 84. The first predetermined high temperature value 84 preferably is an excessively high performance temperature for the tire 12, such as about 60 degrees Fahrenheit more than an expected operating temperature for the tire. For example, if the tire 12 includes an expected operating temperature of about 120 degrees Fahrenheit, the first predetermined high temperature value 84 is about 180 degrees Fahrenheit. If the measured tire temperature 58 is greater than the first predetermined high temperature value 84, the tire high temperature forecasting system 10 executes the forecasting module 74. If the measured tire temperature 58 is equal to or less than the first predetermined high temperature value 84, the measured tire temperature is analyzed under a second condition 86.

The second condition 86 preferably includes comparing the measured tire temperature 58 to a second predetermined high temperature value 88 and an additional state 90. The second predetermined high temperature value 88 is lower than the first predetermined high temperature value 84, but is still a high performance temperature for the tire 12. Preferably, the second predetermined high temperature value 88 is about 20 degrees Fahrenheit more than an expected operating temperature for the tire 12. Thus, if the tire 12 includes an expected operating temperature of about 120 degrees Fahrenheit, the second predetermined high temperature value 88 may be about 140 degrees Fahrenheit.

Also in the second condition 86, the measured tire temperature 58 is compared to the additional state 90. The additional state 90 includes comparing the measured tire temperature 58 to a statistical value 92. By way of example, the statistical value 92 may include the sum of the statistical mean of a selected group of temperature measurements 58 plus twice the standard deviation of the selected group of temperature measurements.

In the second condition 86, if the measured tire temperature 58 is greater than the second predetermined high temperature value 88 and the measured tire temperature is greater than the statistical value 92, the tire high temperature forecasting system 10 executes the forecasting module 74. If the measured tire temperature 58 is equal to or less than the second predetermined high temperature value 88, or the measured tire temperature is equal to or less than the statistical value 92, a consistent high temperature condition is not present for the tire 12 and the tire high temperature forecasting system 10 takes no further action.

Figure 7A:
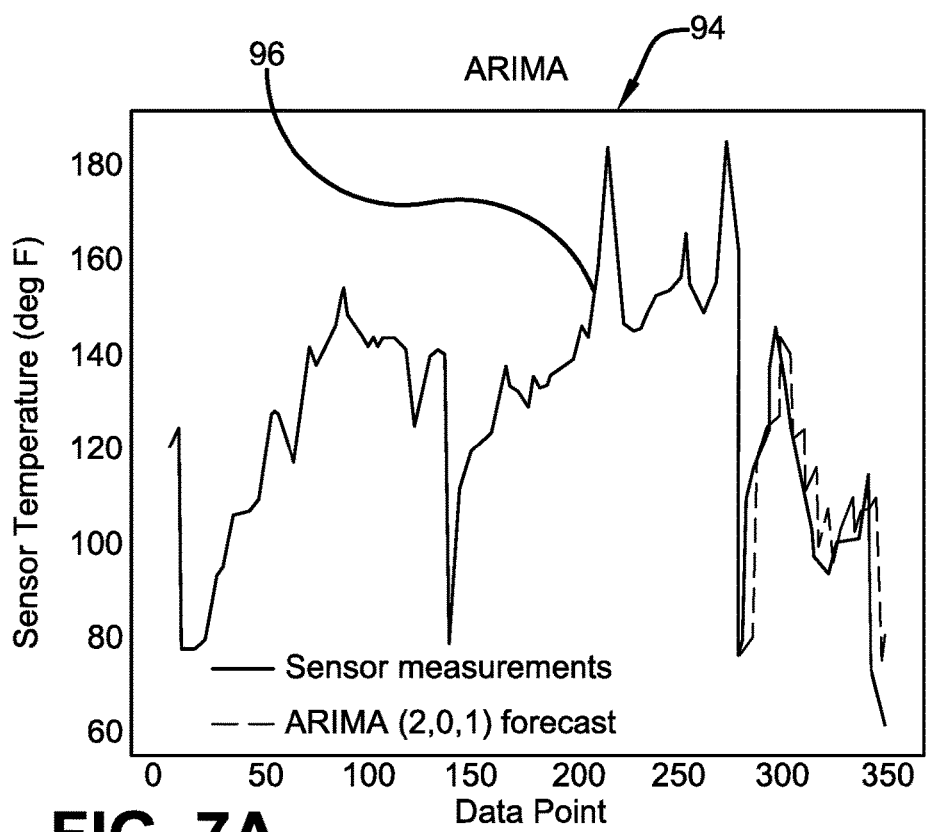
FIG. 7A is a graphical representation of data generated by a first modeling technique in accordance with an exemplary embodiment of the tire high temperature forecasting system of the present invention.
Figure 7B:
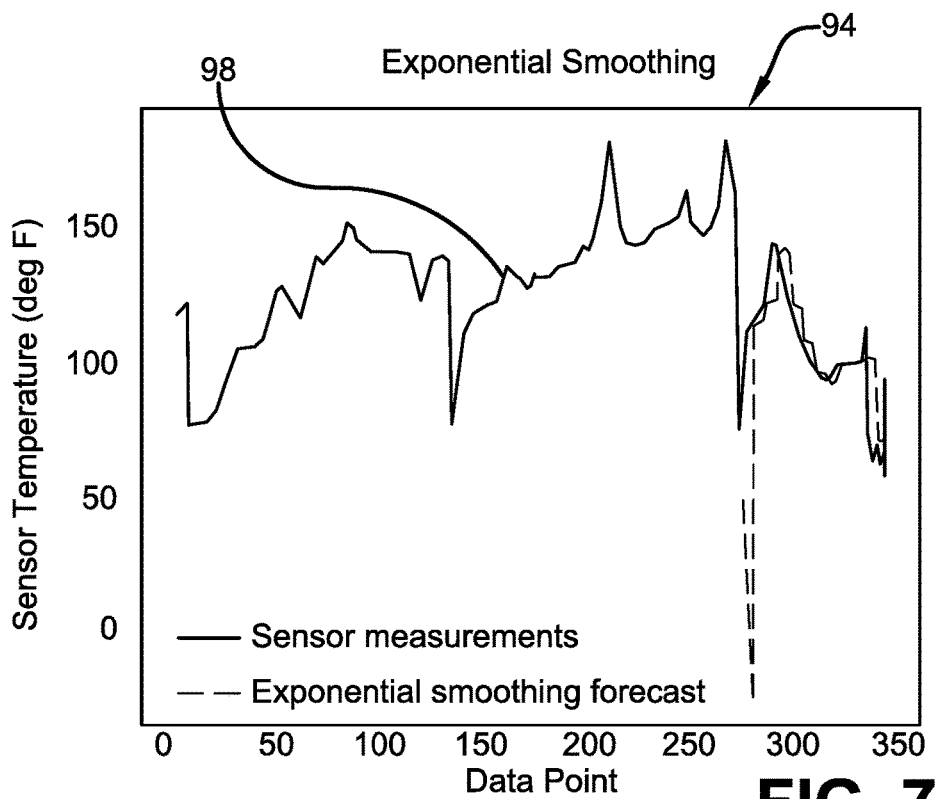
FIG. 7B is a graphical representation of data generated by a second modeling technique in accordance with an exemplary embodiment of the tire high temperature forecasting system of the present invention.

With reference to FIGS. 5, 7A and 7B, when the forecasting module 74 is executed based on the conditions above, a time series analysis model 94 preferably is employed. The time series analysis model 94 includes a modeling technique that forecasts future values based on past values. For example, the time series analysis model 94 may include an auto regressive integrated moving average (ARIMA) model 96 or an exponential smoothing model 98.

In a training sub-module 100, the time series analysis model 94 is trained for the specific tire 12 using measured tire temperatures 58. Once the time series analysis model 94 has been trained, a calculation sub-module 102 executes the model to obtain a forecast estimate 104, preferably in the form of a confidence interval. For example, the forecast estimate 104 may be a confidence interval over a predetermined time span of the measured tire temperature 58, such as a subsequent 30-minute period after the time at which the forecast has been generated.

Figure 8A:
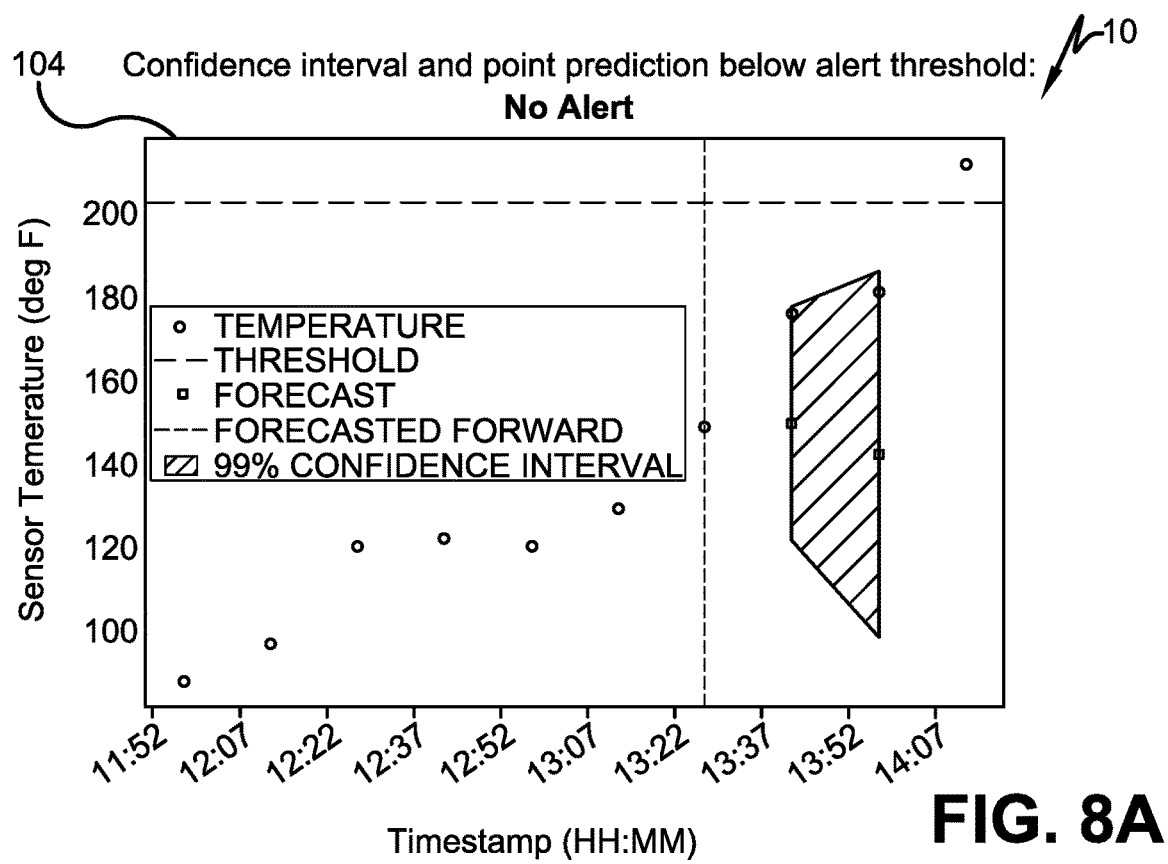
FIG. 8A is a graphical representation of a data forecast in accordance with an exemplary embodiment of the tire high temperature forecasting system of the present invention, showing a forecast temperature below an alert threshold.
Figure 8B:
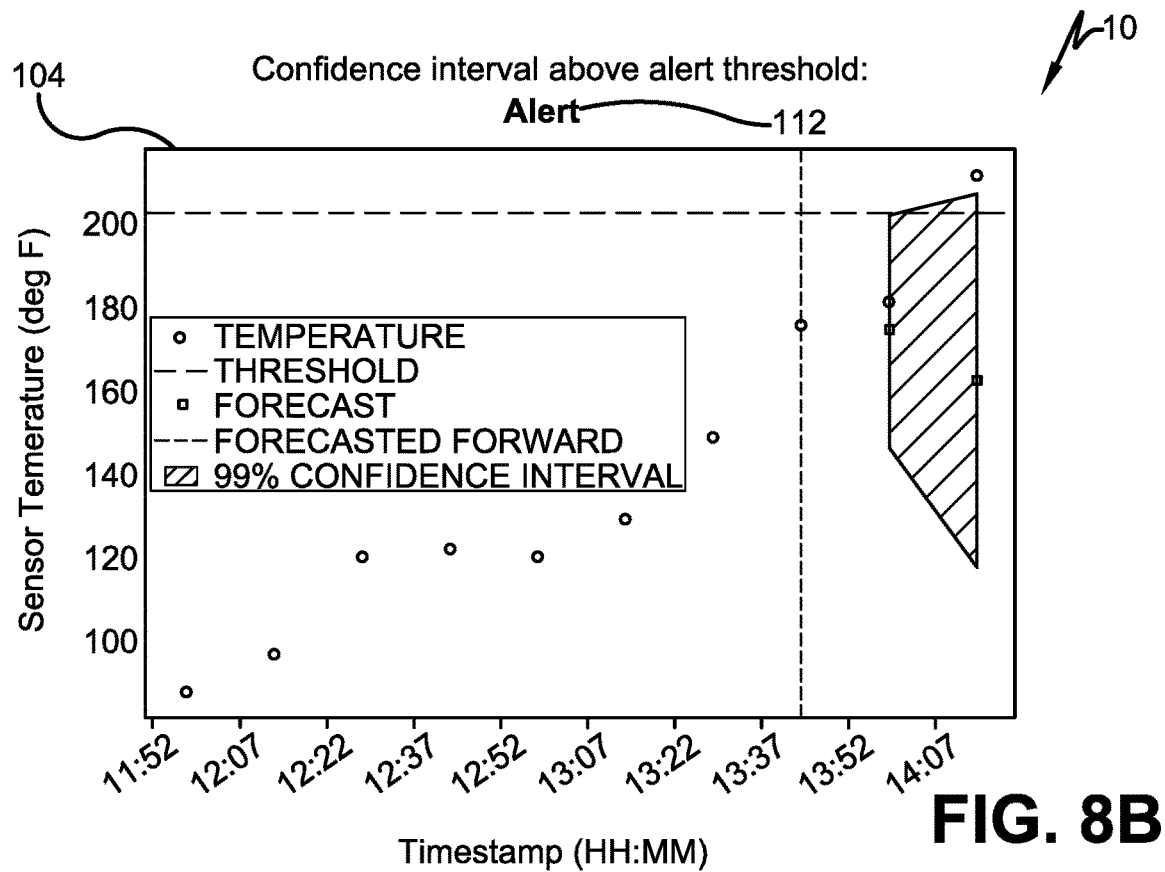
FIG. 8B is a graphical representation of a data forecast in accordance with an exemplary embodiment of the tire high temperature forecasting system of the present invention, showing a forecast temperature above an alert threshold.

With continuing reference to FIG. 5, when the forecast estimate 104 has been calculated, it is input into a final filtering sub-module 106 of the alert module 76. In the final filtering sub-module 106, if the forecast estimate 104 is less than or equal to the high temperature threshold 62, it is determined that the tire 12 is not likely to encounter a high temperature condition, and the tire high temperature forecasting system 10 takes no further action, as shown in FIG. 8A. If the forecast estimate 104 is greater than the high temperature threshold 62, the system 10 has estimated that a temperature greater than the high temperature threshold, which is referred to as a predicted high temperature 108, is likely to occur for the tire 12 in the near future, as shown in FIG. 8B. The near future refers to a predetermined window of time, such as within 30 minutes from the calculation of the forecast estimate 104. If the predicted high temperature 108 is likely to occur, an alert generator 110 sends a proactive alert 112.

Returning to FIG. 3, when the proactive alert 112 is sent by the alert generator 110, the alert preferably is wirelessly transmitted 46 from the cloud-based server 44 to the fleet management server 50 and shown on the display 52. If the tire high temperature forecasting system 10 is executed on the fleet management server 50, the alert 112 is generated by the server and shown on the display 52. Display of the predicted high temperature alert 112 enables a fleet manager viewing the display 52 to take preventative measures, such as instructing a vehicle operator to slow the vehicle 14 down and/or direct the vehicle to a service center. The alert 112 may also be transmitted directly to a device that is visible to the operator of the vehicle 14, thereby enabling the operator to take action based on the alert.

In this manner, the tire high temperature forecasting system 10 obtains measured temperature data 58 for a specific tire 12 and provides a forecasting model 70. The forecasting model 70 generates a forecast estimate 104. If the forecast estimate includes a predicted high temperature 108, which is a temperature greater than the predetermined high temperature threshold 62 for the tire 12, an alert 112 is sent to a fleet manager and/or an operator of the vehicle 14 on which the tire is mounted. The alert 112 enables action to be taken to reduce the temperature of the tire 12 before the predicted high temperature 108 occurs, thereby preventing a high-temperature condition. Of course, the forecasting model 70 may be executed repeatedly and at multiple time intervals, enabling multiple or subsequent alerts 112 to be sent based on the estimation of the predicted high temperature 108.

The present invention also includes a method of tire high temperature forecasting. The method includes steps in accordance with the description that is presented above and shown in FIGS. 1 through 8B.

It is to be understood that the structure and method of the above-described tire high temperature forecasting system and method may be altered or rearranged, or components or steps known to those skilled in the art omitted or added, without affecting the overall concept or operation of the invention.

The invention has been described with reference to a preferred embodiment. Potential modifications and alterations will occur to others upon a reading and understanding of this description. It is to be understood that all such modifications and alterations are included in the scope of the invention as set forth in the appended claims, or the equivalents thereof.

What is claimed is:

1. A tire high temperature forecasting system comprising:
   at least one tire supporting a vehicle;
   at least one sensor mounted on the tire for measuring a temperature of the at least one tire;
   an electronic memory capacity in a unit mounted on the at least one tire for storing tire identification information;
   a processor in electronic communication with the at least one sensor and the electronic memory capacity, wherein the processor receives and correlates the measured temperature, a time of the temperature measurement, and the tire identification information;
   transmission means for transmitting the measured temperature, a time of the temperature measurement, and the tire identification information to a remote processor;
   a forecasting model executed by the remote processor, the forecasting model generating a forecast estimate, the forecasting model including a filtering module, the filtering module including a filter sub-module, wherein:
   the filter sub-module analyzes the measured temperature under a first condition, wherein the first condition includes comparing the measured tire temperature to a first predetermined high temperature value;
   the filter sub-module analyzes the measured temperature under a second condition when the measured tire temperature is equal to or less than the first predetermined high temperature value, wherein the second condition includes comparing the measured tire temperature to a second predetermined high temperature value and an additional state; and
   the additional state includes comparing the measured tire temperature to a statistical value, wherein the statistical value includes the sum of a statistical mean of a selected group of temperature measurements plus twice a standard deviation of the selected group of temperature measurements; and
   an alert generated by the forecasting model when the forecast estimate includes a predicted high temperature that is greater than a predetermined high temperature threshold for the at least one tire.

2. The tire high temperature forecasting system of claim 1, wherein the forecasting model includes a forecasting module and an alert module.

3. The tire high temperature forecasting system of claim 1, wherein the filtering module includes an input sub-module, the input sub-module grouping the measured temperature according to the time of the temperature measurement, the tire identification information, and the vehicle on which the at least one tire is mounted.

4. The tire high temperature forecasting system of claim 1, wherein the first predetermined high temperature value is 60 degrees Fahrenheit more than an expected operating temperature for the at least one tire.

5. The tire high temperature forecasting system of claim 1 wherein the second predetermined high temperature value is 20 degrees Fahrenheit more than an expected operating temperature for the at least one tire.

6. The tire high temperature forecasting system of claim 2, wherein the forecasting module executes the forecasting model and includes a time series analysis model.

7. The tire high temperature forecasting system of claim 6, wherein the time series analysis model includes at least one of an auto regressive integrated moving average model and an exponential smoothing model.

8. The tire high temperature forecasting system of claim 6, wherein the forecasting module includes a training sub-module for training the time series analysis model.

9. The tire high temperature forecasting system of claim 6, wherein the forecasting module includes a calculation sub-module, and the calculation sub-module executes the forecasting model to generate the forecast estimate.

10. The tire high temperature forecasting system of claim 9, wherein the forecast estimate includes a confidence interval over a predetermined time span.

11. The tire high temperature forecasting system of claim 2, wherein the alert module includes a final filtering sub-module, the final filtering sub-module comparing the forecast estimate to the predetermined high temperature threshold for the at least one tire.

12. The tire high temperature forecasting system of claim 1, wherein the alert is generated by the forecasting model when the forecast estimate includes the predicted high temperature being greater than the predetermined high temperature threshold in a predetermined window of time.

13. The tire high temperature forecasting system of claim 1, wherein the remote processor is disposed in a cloud-based server.

14. The tire high temperature forecasting system of claim 13, wherein the alert is wirelessly transmitted from the cloud-based server to a fleet management server.

15. The tire high temperature forecasting system of claim 1, wherein the remote processor is disposed in a fleet management server.

16. The tire high temperature forecasting system of claim 1, wherein the alert is transmitted to at least one of a display that is visible to a fleet manager and a device that is visible to an operator of the vehicle.

17. The tire high temperature forecasting system of claim 1, wherein the electronic memory capacity is integrated into the at least one sensor.

* * * * *